United States Patent [19]
Wischermann

[11] Patent Number: 5,245,414
[45] Date of Patent: Sep. 14, 1993

[54] VIDEO SIGNAL SYNCHRONIZER FOR A VIDEO SIGNAL IN LUMINANCE AND CHROMINANCE COMPONENT FORM

[75] Inventor: Gerhard Wischermann, Weiterstadt, Fed. Rep. of Germany

[73] Assignee: BTS Broadcast Television Systems GmbH, Darmstadt, Fed. Rep. of Germany

[21] Appl. No.: 472,348

[22] Filed: Jan. 30, 1990

[30] Foreign Application Priority Data

Feb. 10, 1989 [DE] Fed. Rep. of Germany ....... 3903922

[51] Int. Cl.⁵ .......................... H04N 9/87; H04N 9/88
[52] U.S. Cl. ....................................... 358/17; 358/19
[58] Field of Search ..................... 358/17, 19, 148, 149

[56] References Cited

U.S. PATENT DOCUMENTS 4,768,102 8/1988 O'Gwynn ............................. 358/17
4,989,073 1/1991 Wagner ................................. 358/19

FOREIGN PATENT DOCUMENTS

0122561A1 10/1984 European Pat. Off. .
3822293A1 1/1990 Fed. Rep. of Germany .
2026278A 1/1980 United Kingdom .
2030740A 4/1980 United Kingdom .
2143399A 11/1985 United Kingdom .

Primary Examiner—Tommy P. Chin
Attorney, Agent, or Firm—Frishauf, Holtz, Goodman & Woodward

[57] ABSTRACT

Video signals are supplied as component signals (in which the color signals are not correlated with a color carrier wave) and are stored in a frame memory and read out therefrom in synchronism with supplied reference signals. A FIFO memory is interposed ahead of the frame memory for delaying the video signals in such a way that they can be brought into synchronism with the horizontal phase of the reference signals. The system can be made to operate in a frame mode in which the field sequence and the timing of the synchronizing pulses always agree with those of the reference signal, in a field mode in which only horizontal sychronization is provided and the field sequence can be modified, a line mode in which the input signal is merely delayed into synchronism with the horizontal phase of the reference signal, and a delay mode in which a substitute reference signal is derived from the input signal itself, so that the memory is used merely for delay.

14 Claims, 8 Drawing Sheets

VIDEO SIGNAL SYNCHRONIZER FOR A VIDEO SIGNAL IN LUMINANCE AND CHROMINANCE COMPONENT FORM

This invention concerns a video signal synchronizer suitable for digital video signals and, more particularly, a synchronizer which includes an intermediate video memory into which the signals are written and from which they are read out in synchronism with locally available reference signals.

Equipment is known for synchronizing color television signals in which asynchronously supplied color television signals are intermediately stored and read out from storage with a reference timing signal which is also used for reading out other color television signals, as for example in a mixer. In such known equipment, the so-called synchronizers are designed for the special requirements of color transmission at the frequency of an auxiliary carrier. In consequence, for example, the processing is performed with analog to digital conversion with a sampling rate locked to a color carrier.

SUMMARY OF THE INVENTION

It is, however, the object of the present invention to provide equipment for synchronizing component signals of color television in which the color carrier is absent and to do so in a manner which will make possible, by use of the properties of these component signals, a synchronization which is as effective and favorable as possible.

Briefly, the video signals are supplied to a complete picture (frame) memory in the form of such component signals for purposes of synchronization. More particularly, reference signals are used for timing read out and a FIFO memory is interposed between the frame memory input and a source of separated luminance and chrominance signals. In that FIFO memory digital video signals are delayed in such a way that they coincide with the reference signals with regard to horizontal phase. Still more particularly, the entry of the video signals into the FIFO memory is started with a frame synchronizing pulse derived from the video signals and takes place with a clock signal derived from the video signals, whereas reading of the FIFO memory is timed by a reference clock signal of the same frequency as the input clock signal and also by a first pulse of a horizontal frequency reference signal which appears a predetermined time after the frame synchronizing pulse.

The synchronizer of the invention has the advantage that it involves relatively low expense. Furthermore, separate H, V and 2 V synchronization is possible. Finally, a simple still picture generation is provided when there is no input signal. Further advantages consist in that the quantization distortion of the digital signals, for the same number of binary places in the digital words, is smaller than in the case of the known synchronizers and that a fine phase adjustment of the digital output signal can be performed.

The sync and clock signals derived from the input video signals can be substituted for the corresponding reference signals for use of the system as a controllable delay.

BRIEF DESCRIPTION OF THE DRAWINGS

The further features of more fully developed embodiments of the invention will be best understood from the illustrated description that follows, making reference to the annexed drawings, in which.

The same parts are designated with the same reference symbols when they appear in more than one of the figures.

DESCRIPTION OF THE ILLUSTRATED EMBODIMENTS

In the usual line interlace pattern of present day television technology the odd numbered lines form a first picture field and the even numbered lines a second picture field. Accordingly, in what follows, a first picture field means a field which is distinguished from a second picture field by its vertical position and which together the second picture field forms a complete picture or frame.

The term frame, of course, has been taken over from motion picture filming practice.

A picture field in this sense is not a contiguous region of a picture that has an individual picture content for a certain absolute point in time. Picture fields which have the same vertical position in a frame for a complete picture are accordingly designated as similar fields, corresponding fields or equivalent fields.

Figure 1:
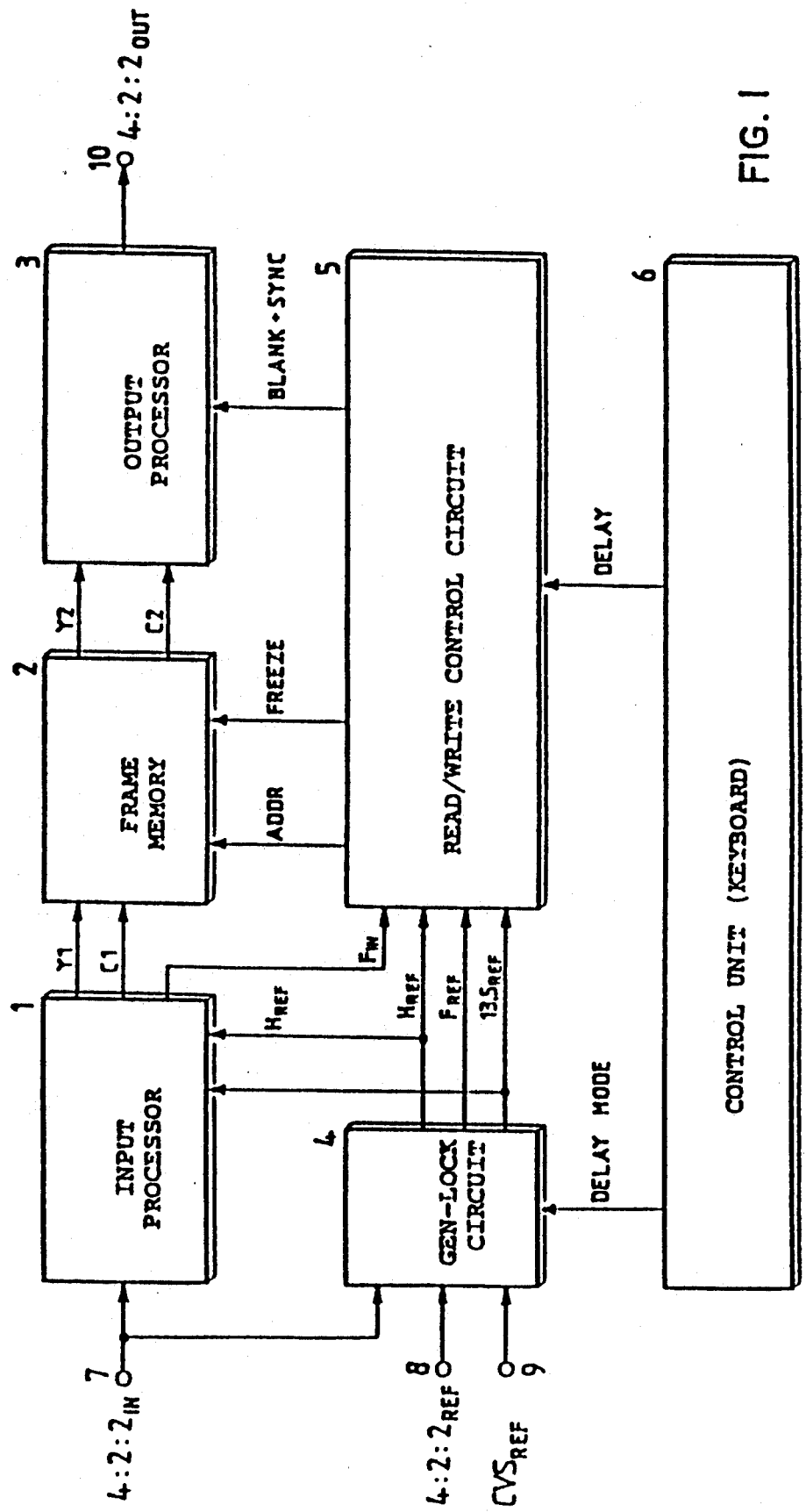
FIG. 1 is a basic block diagram of an embodiment of the invention.

The embodiment shown in FIG. 1 consists of an input processor 1, a frame memory 2, an output processor 3, a gen-lock circuit 4, a read/write control circuit 5 and a keyboard or control unit 6. The component signals $4:2:2_{IN}$ which are to be synchronized are supplied through an input 7 to the input processor 1. These are digital signals conforming to the so-called 4:2:2 Standard in which the sample values of luminance are transmitted at a frequency of 13.5 MHz and the interleaved sets of sample values of chrominance are each transmitted at a frequency of 6.75 MHz, in time multiplex. Furthermore, since a sample value is always transmitted as a parallel 8-bit wide data word and a chrominance value is always transmitted between every two successive luminance values the result is an overall sample or byte frequency of 27 MHz.

There are furnished to the gen-lock circuit 4, in addition to the component signal $4:2:2_{IN}$, which hereinafter is also referred to as the input signal, a first (digital) reference signal $4:2:2_{REF}$ and a second (analog) reference signal $CVS_{REF}$, respectively over inputs 8 and 9. From respective outputs of the input processor 1 a luminance signal Y1 and a chrominance signal C1 are supplied to the frame memory 2. The outputs that are read out from the frame memory 2 are a luminance signal Y2 and a chrominance signal C2, which are both supplied to the output processor 3 in which these two inputs are converted into an output component signal $4:2:2_{OUT}$, which is made available at the output 10 and has a phase that is the same as that of the first reference signal $4:2:2_{REF}$ supplied at the input 8 of the entire circuit.

The keyboard or control unit 6 makes possible the selection of the various modes of operation. Furthermore, an adjustment of the phase of the output signal $4:2:2_{OUT}$ can be performed by it. Details of the circuits 1, 2 . . . 5 are explained with reference to additional figures, as are also the signals variously designated in FIG. 1 which are passed between the circuits 1, 2 . . . 5.

Before further details are described by reference to FIGS. 2-11, however, the various modes of operation of the system of the invention will be explained. First, if it is selected to utilize the input signal for derivation of the reference signals by means of the gen-lock circuit 4, the output signal will then be in phase with the input signal, but delayed by one frame. This follows from the fact that the signal path runs through a certain number of elements that produce a fixed amount of delay, so that a minimum delay is always present which is set to the overall propagation time of one frame by the controllable delay devices in the system, namely the FIFO memory 15 and the frame memory 2. In this manner of operation, referred to as the DELAY mode, the system of the invention operates as an adjustable delay device for video signals. The delay time can be adjusted by suitable control signals as will be described further below.

In the frame synchronizer mode, usually called simply the SYNC mode, one of the reference signals, either the digital reference signal $4:2:2_{REF}$ or the analog reference signal $CVS_{REF}$, is supplied respectively to the input 8 or the input 9. In this mode of operation, in accordance with the name of the mode, the output signal is in phase with the reference signal. In this mode, however, the phase position of the output signal can supplementarily be changed. In particular, even a time advance is possible, in order to compensate for the propagation time of apparatus downstream in the signal path.

In the FIELD mode of synchronization it is assured by the write/read control circuit 5 that the frame memory sets the vertical phase of the output signal in exact synchronism with the fields. This mode will be further explained in connection with FIG. 11.

Finally there is a LINE mode in which the output signal is in phase with a reference signal of horizontal frequency, while the vertical phase of the input signal is maintained. This mode is suited to input signals which are delayed compared to the reference signals by less than one line, for automatically bringing them into phase with the horizontal frequency signals. Details regarding this mode are explained in connection with FIG. 7.

The input processor shown in FIG. 1 contains a voltage level adjusting circuit 13 for converting from the ECL level to the TTL level and a circuit 14 for splitting up of the input signal $4:2:2_{IN}$ into a luminance signal YO and a chrominance signal CO. A FIFO memory 15 is provided in which the signals YO and CO are delayed to such an extent that the output signals Y1 and C1 of the FIFO memory 15 will thenceforth fit into the line pattern of the reference signal. In the explanations that follow FIG. 3 will also be taken into consideration. It shows time diagrams of the signals appearing in the input processor. For simplicity of presentation the signals of 13.5 MHz repetition rate are shown in the diagram at a lower frequency in relation to the other signals.

In the synchronization signal separator 16 there are separated out of the input signal $4:2:2_{IN}$ a clock or sample rate signal $13.5_{IN}$ having the frequency of 13.5 MHz and a timing signal F which has the value 0 during every first picture field and the value 1 during every second picture field and at the same time designates by its flanks the beginnings of the respective fields. It may be referred to as a field designation signal. Furthermore a frame pulse $F_{RES}$ is derived therefrom which designates the beginning of every frame.

The writing of the signals YO, CO and F into the FIFO memory 15 takes place with the assistance of the clock signal $13.5_{IN}$. At the beginning of every frame the content of the FIFO memory 15 is erased by the $F_{RES}$ pulse, which for that purpose is supplied to an input RES of the FIFO memory and through an OR gate 17 to the input WR of the FIFO memory. The data word thereafter written in is read out with the next read clock pulse, for which purpose a reference clock signal $13.5_{REF}$ is supplied through an input 18 and an AND gate 19. The reference clock signal $13.5_{REF}$, however, gets through the AND gate 19 to the input RD of the FIFO memory 15 at the earliest after a constant delay interval. This delay is necessary in order to produce a certain advance of the write-in operation, since the read/out clock pulses $13.5_{REF}$ can be somewhat more frequent that the write pulses $13.5_{IN}$ and might otherwise allow the FIFO memory 15 to "run dry." This delay is generated by means of a counter 20, the clock input of which receives the reference clock pulse signal $13.5_{REF}$. The counter 20 is reset by the frame signal $F_{RES}$. At a predetermined time defined by a predetermined count content, the counter 20 generates an output RD-delay pulse which is supplied to the reset input of a flip-flop 21.

Figure 2:
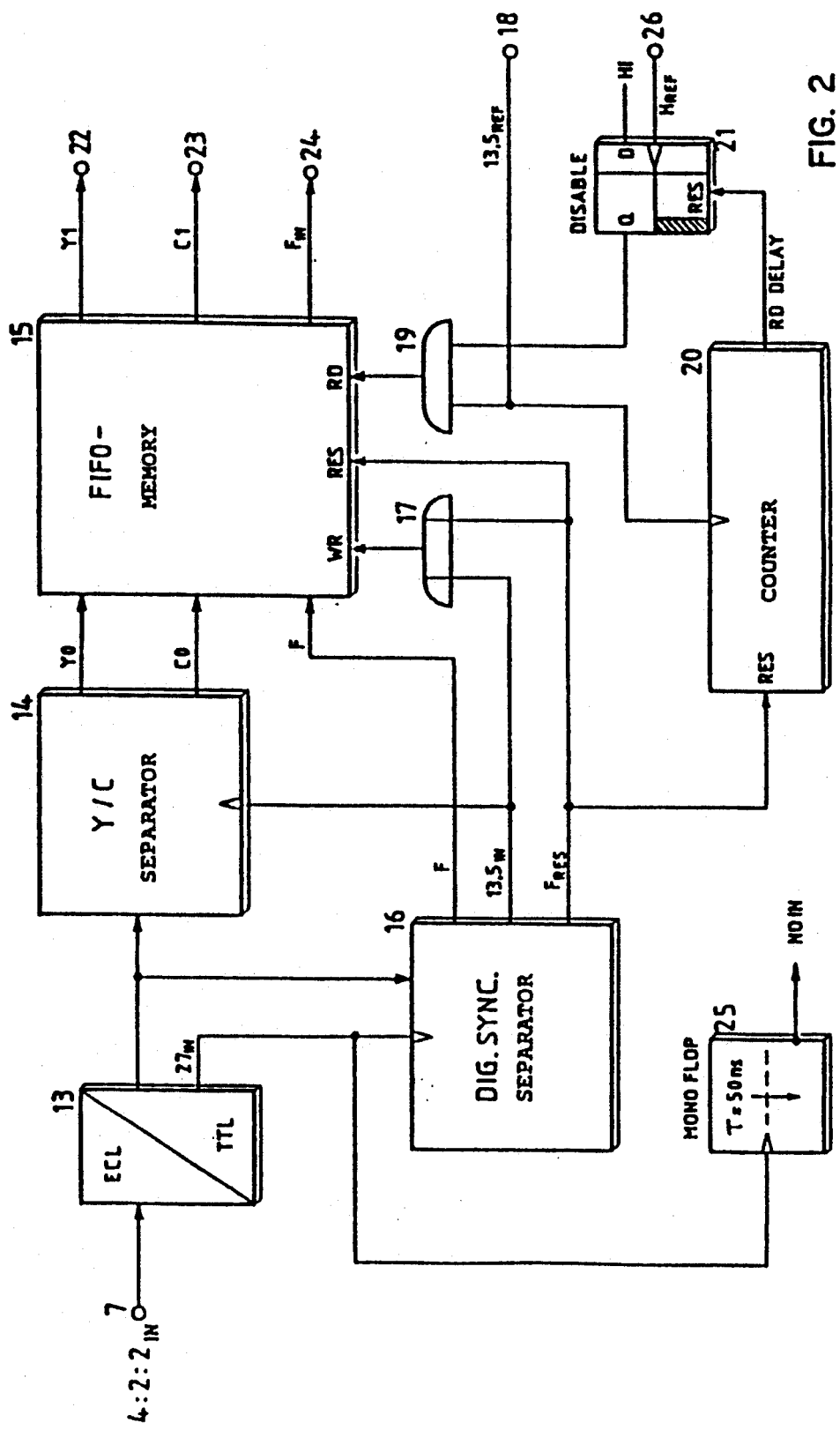
FIG. 2 is a block circuit diagram of an input processor of the system of FIG. 1.
Figure 3:
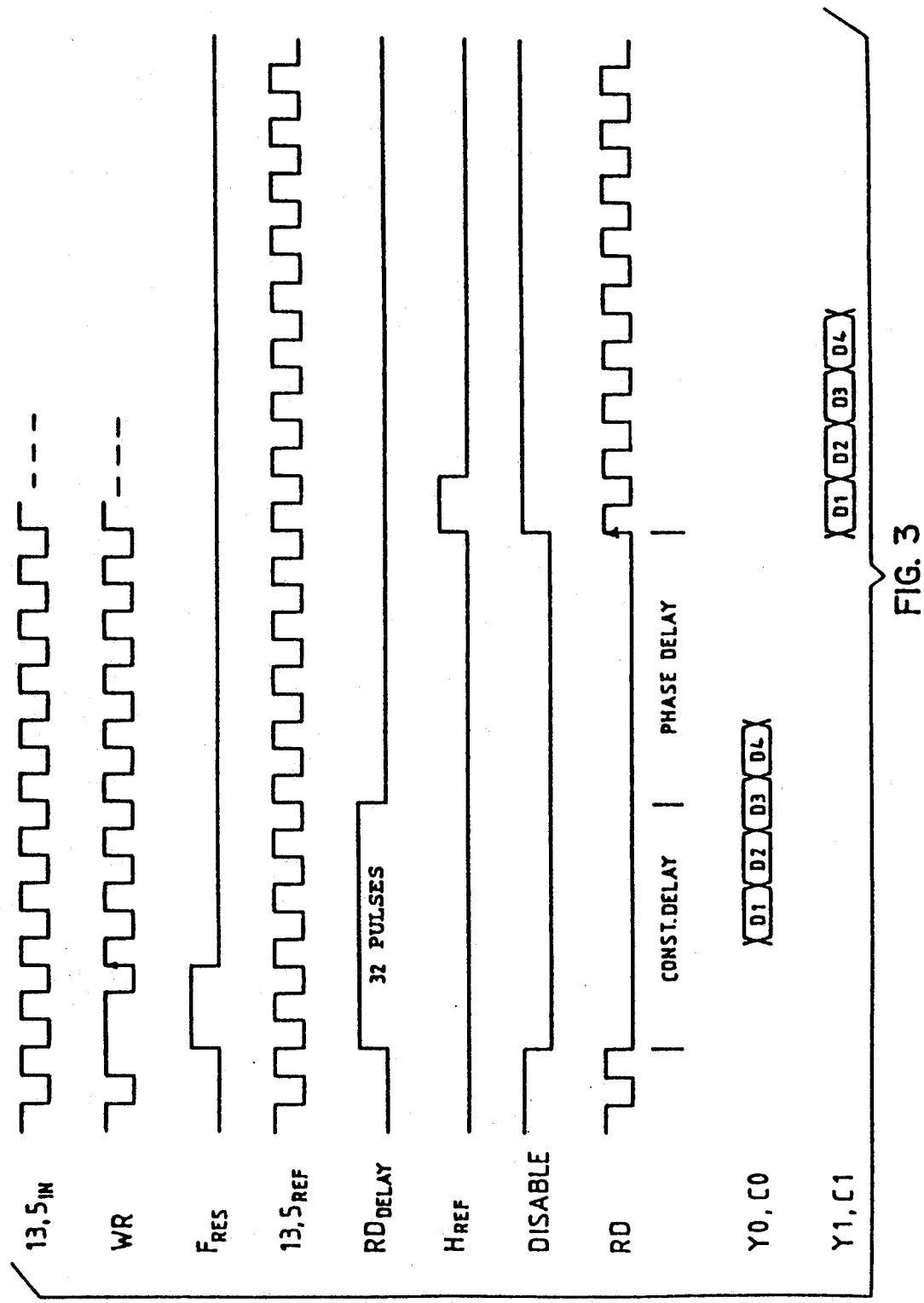
FIG. 3 is a timing diagram illustrating signals appearing in the input processor of FIG. 2.

The flip-flop 21 after being reset as just described, is set to its other state by a horizontal frequency reference signal $H_{REF}$ shown in FIG. 2 as supplied at a terminal 26. The flip-flop 21 serves to produce at its Q output a DISABLE signal that is supplied to the RD input of the FIFO memory 15 for suppressing the read out clock pulses until a positive flank of the signal $H_{REF}$ appears at the terminal 26, this correlation of signals being provided by the AND gate 19.

The delay of the input signal $4:2:2_{IN}$ by the FIFO memory 15 is thus proportional to the length of the read out clock pulses supplied to the input RD. This read out clocking begins with the appearance of the pulse $F_{RES}$ (beginning of the first picture field at the input) and ends with the line start defined by the reference signal $H_{REF}$. This delay has a value of at least 32 clock periods. The range of variation of the phase adjustment circuit constituted by the FIFO memory 15 extends thus from 32 clock periods up to the sum of 32 periods plus one horizontal synchronizing period. This basic delay of 32 clock periods in the FIFO memory 15 and the number of preceding and subsequent clockings in the signal path determine the so-called minimum delay of the synchronizer. This can be kept to an extreme minimum value in the system of the present invention.

A further important property of a synchronizer is the transparence of the V/blanking interval. By that term is understood how many lines of the vertical frequency blanking interval are not transmitted. This value is likewise favorable in the system of the present invention and amounts to one line plus 32 clock periods in the illustrated example. This corresponds to the maximum delay of the FIFO memory 15, when the clocking out of its contents has a maximum length. The degree of filling of the FIFO memory at the beginning of read-out then amounts to 864+32, or 896, when it is assumed that there are 864 samples per line.

Until the next reset pulse $F_{RES}$ the degree of filling of the FIFO memory 15 can grow if the frequency of the read out is lower than the frequency of the write-in of samples. At the next reset, therefore at the beginning of the next frame, the FIFO memory is, however, erased (cleared) and the entire content of this FIFO memory thus gets lost from read-out. The last of the about 896 data words preceding the reset pulse thus represent the non-transparent portion of the vertical frequency blanking interval.

The FIFO memory 15 has a suitable capacity of, for example, 1024 data words, wherein a data word in each case contains 8 bits of luminance, 8 bits of chrominance and 1 bit for field designation. The output signals Y1 and C1 of the FIFO memory 15 are produced in phase with the clock signal $13.5_{REF}$ and are supplied to outputs 22 and 23 to the frame memory 2 of FIG. 1. The likewise phase-synchronized field designation signal $F_{IN}$ supplied from another output of the FIFO memory 15 to write/read control circuit 5 of FIG. 1. A monostable circuit 25 provided in the input processor generates, in response to the 27 MHz clock rate of the component signals $4:2:2_{IN}$, a no-input signal NOIN, which goes to the HI level when there is no input signal for a predetermined time interval, for example 50 ns. The evaluation of this signal will be described farther on.

Description of the details of the frame memory 2 of FIG. 1 is not needed here because such memories are sufficiently well known and in production and actually can be used for the system of this invention without any special changes. A suitable memory for this purpose is disclosed in the copending U.S. patent application Ser. No. 07/406,763 assigned to the Assignee of this application. Address signals ADDR and also a FREEZE signal are supplied to the frame memory 2 from the write/read control circuit 5 of FIG. 1. The FREEZE signal has the effect that the contents of the frame memory are repeatedly read out without being erased or replaced by new data. The control of the frame memory 2 for the necessary vertical synchronization will be explained farther below in connection with the write/read control circuit 5.

Figure 4:
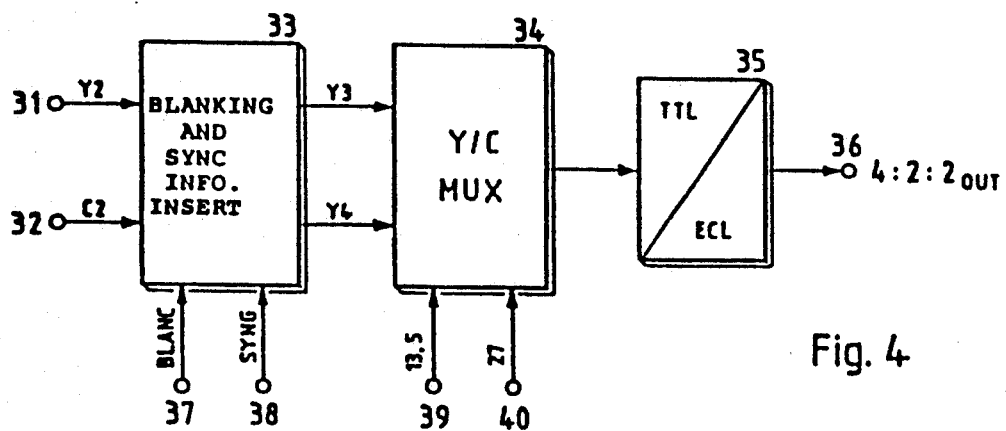
FIG. 4 is a block circuit diagram of an output processor usable in the circuit of FIG. 1.

The output processor 3 of FIG. 1 will next be explained with reference to FIG. 4. It serves to convert the two-channel signal Y, C back into a 4:2:2 signal corresponding to the CCIR 656-1 recommendation. Since the frame memory is not written into during all of the horizontal blanking interval for reasons of economical use of the write/read storage control components and because the FIFO memory 15 of FIG. 2 is not fully transparent in the vertical frequency blanking interval, the signal components Y2 and C2 are first supplied through the inputs 31 and 32 to a circuit 33 for blanking and inserting new synchronization information. For the blanking, for example, the digital value 16 for black and 128 for minimum color intensity are inserted. Next the components Y3 and C3 are recombined in a multiplexer 34 into a 27 MHz data signal which at 35 is converted from the TTL level to the ECL level and then supplied at an output 36 as the signal $4:2:2_{OUT}$. A blanking signal BLANK and a synchronizing signal SYNC are supplied over respective inputs 37 and 38 to the blanking and sync insertion circuit 33. The multiplexer 34 receives the signals $13.5_{REF}$ and $27_{REF}$ over respective inputs 39 and 40.

Figure 5:
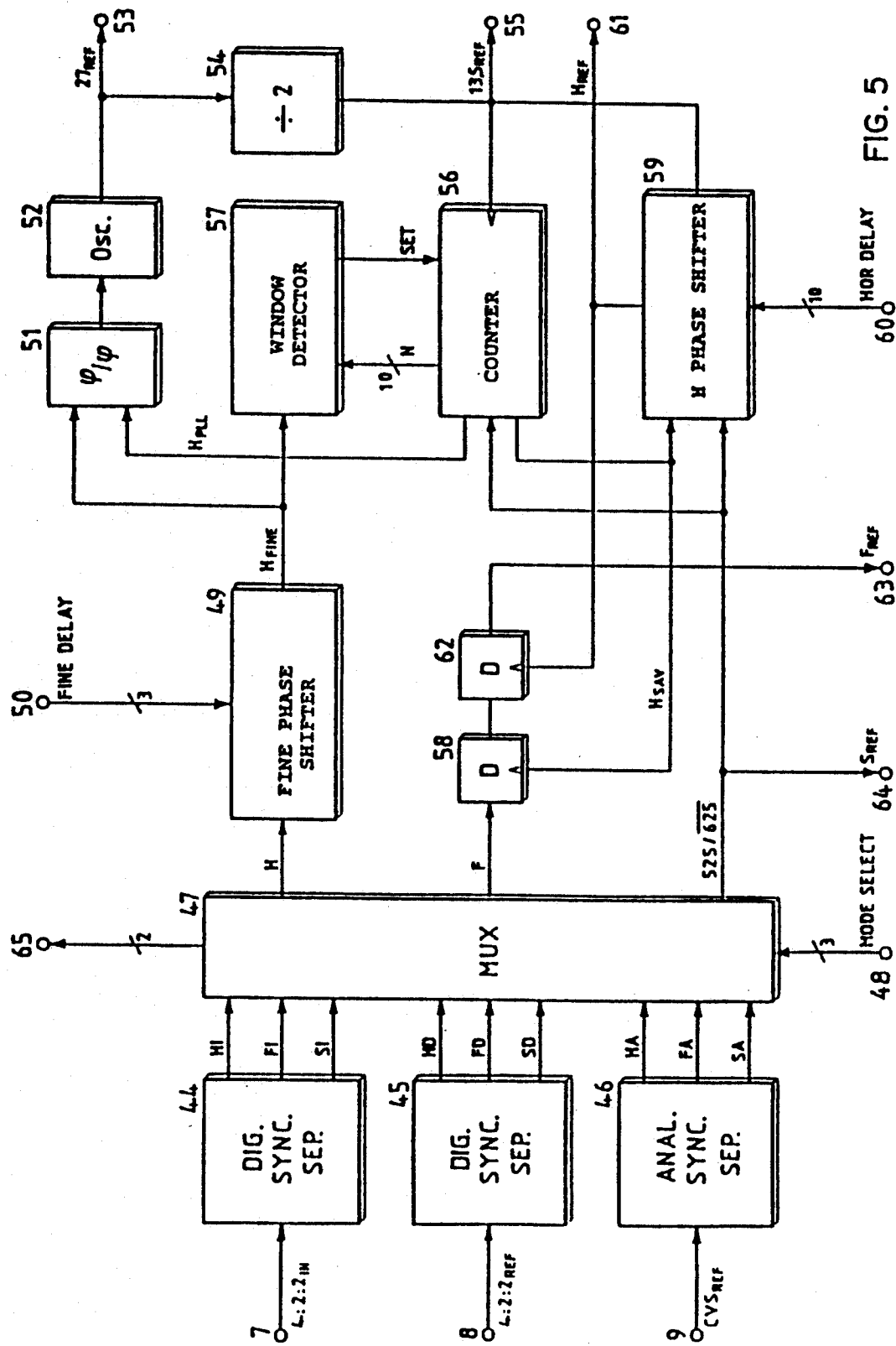
FIG. 5 is a gen-lock circuit, usable in the system of FIG. 1.

The gen-lock circuit shown in FIG. 5 has the task of deriving internally required synchronizing pulses out of the digital reference signal $4:2:2_{REF}$ or out of a similarly supplied analog reference signal $CVS_{REF}$ and also the task of regenerating a reference sample rate by means of a PLL circuit for an output signal and for internal signal processing. The gen-lock circuit is supplied, over respective inputs 7, 8 and 9 with the signal $4:2:2_{IN}$ which is to be synchronized, the reference signal $4:2:2_{REF}$ and, if needed, also an analog reference signal $CVS_{REF}$.

In a first digital synchronization signal separator 44 there are derived, from the input signal $4:2:2_{IN}$, line pulses HI, frame pulses FI and a signal SI for designating to which standard (625 or 525 lines) the component signals which are supplied at the input belong. In a second digital sync separator 45 the corresponding signals HD, FD and SD are derived from the signal $4:2:2_{REF}$. There is also an analog sync separator 46 for deriving the signals HA, FA and SA from a signal $CVS_{REF}$. Sync separators are well known and do not need to be further described in connection with the present invention. Suitable circuits are shown, for example, in the copending patent U.S. patent application Ser. No. 07/410,124 assigned to the assignee of this application.

A multiplexer 47 serves to select from the synchronizing suitable synchronizing information for the task in hand and then to furnish the selected sync information to other circuits. The, multiplexer 47 receives for that purpose, through an input 48 a signal selected by a mode select control located on the keyboard 6 (FIG. 1). The horizontal frequency pulses H are supplied from the multiplexer to a fine-adjustment phase-shifter 49 which is controllable by a fine-delay control signal likewise supplied from the keyboard and the signal H can thereby be delayed by a delay interval which is very small compared to the line duration, for example up to 8 times 10 ns, in order to make possible the exact setting of the phase of the signals $27_{REF}$ and $13.5_{REF}$.

Figure 7:
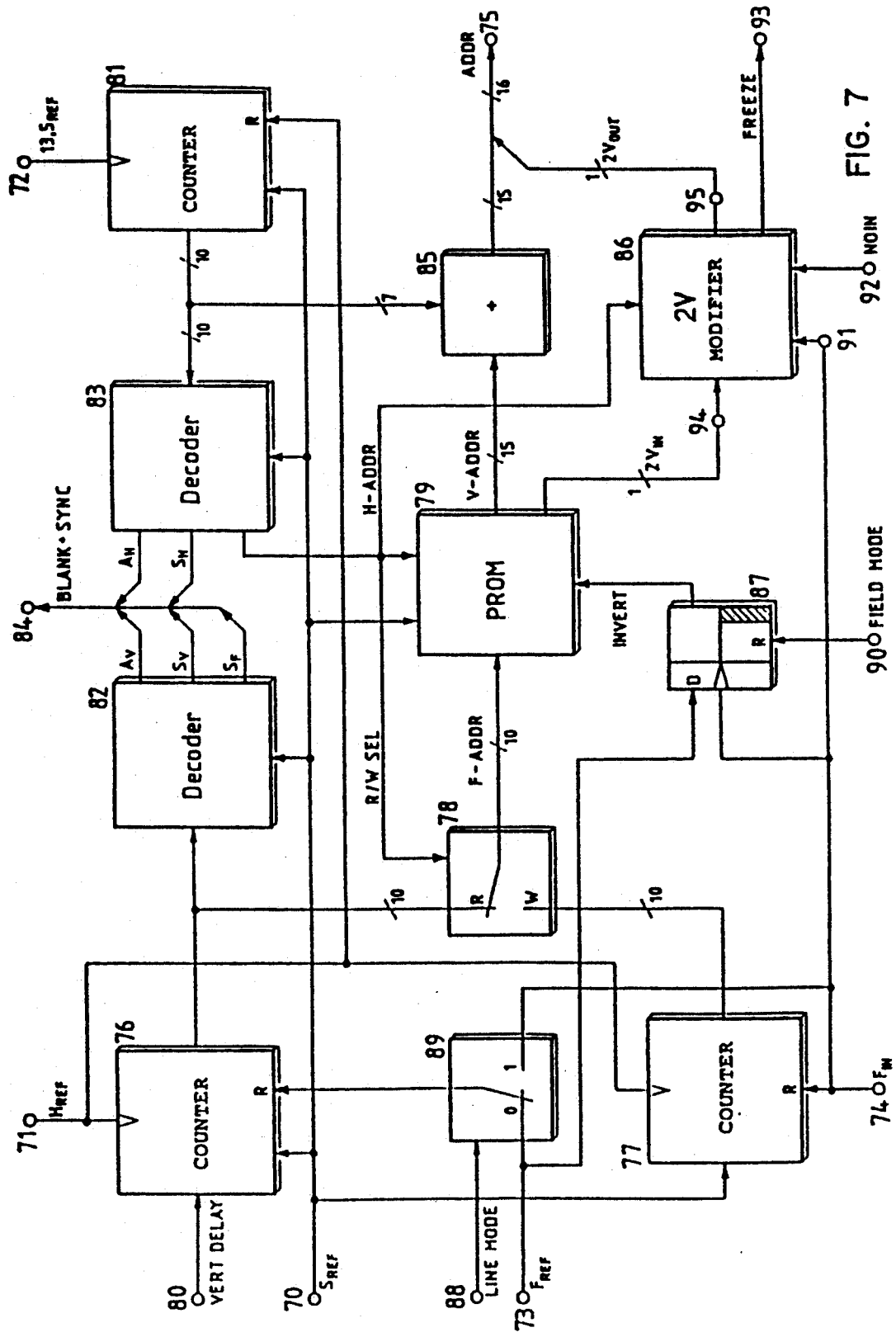
FIG. 7 is a block circuit diagram of a read/write control circuit usable in the system of FIG. 1.
Figure 8:
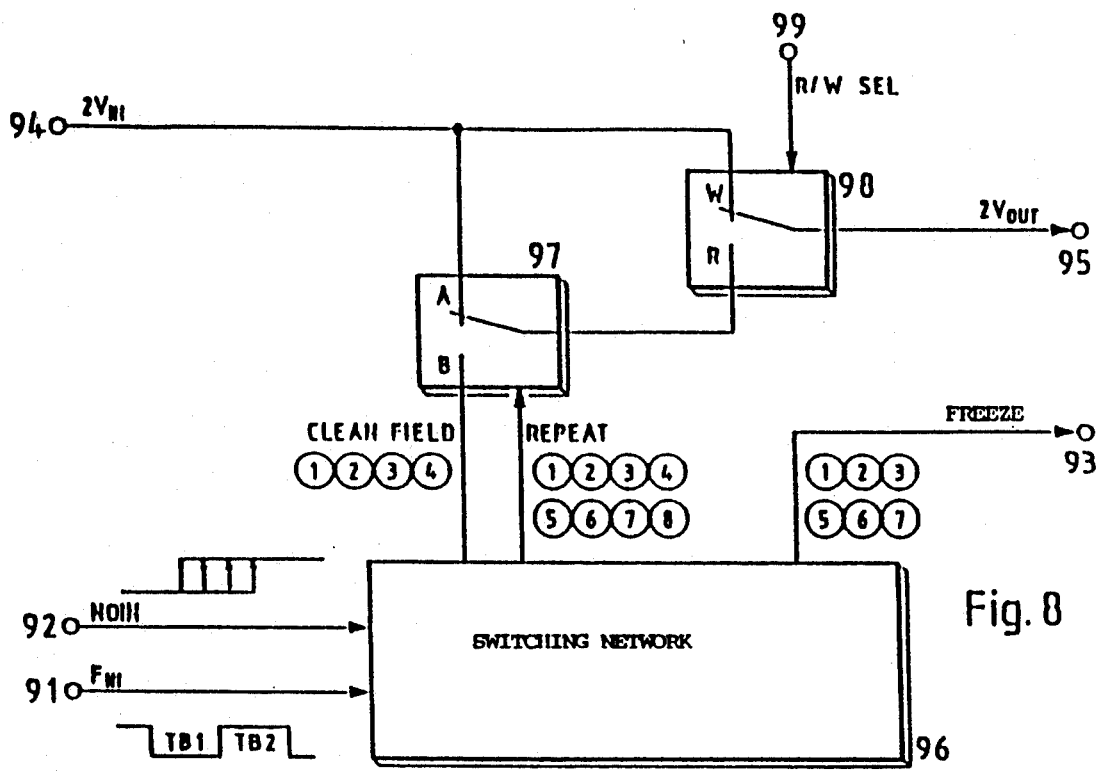
FIG. 8 is a block circuit diagram of a 2 V modifier for use with the system of FIG. 1.

The output signal $H_{FINE}$ of the phase shifter 49 is then supplied to a PLL circuit which consists of a phase comparator 51, a controllable oscillator 52, a division-by-2 circuit 54, a counter 56 and a window detector 57. This PLL circuit generates the signal $27_{REF}$ which is made available at the output 53. The scale of two divider 54 serves to derive the signal $13.5_{REF}$ from the signal $27_{REF}$ and to supply it through the output 55 to the input processor 1 of FIG. 1. The frequency of the signal $13.5_{REF}$ is further divided by the counter 56 down to horizontal scanning frequency. For that purpose it is necessary to divide by 864 in the case of a 625 line standard and to divide by 858 in the case of a 525 line standard. A horizontal frequency signal $H_{PLL}$ which is thus derived is supplied to the second input of the phase comparison circuit 51 of the PLL circuit. The counter 56 is switched over to the correct final divider by the $S_{REF}$ which is also supplied through an output 64 to the write/read control circuit, the details of which are shown in FIG. 7.

The locked condition of the PLL circuit is monitored by the window detector 57. A suitable circuit for the window detector is shown in the soon to be published German patent application (OS) P 38 22 293 of the assignee of the present application. In the locked state of the PLL circuit $H_{FINE}$ and $H_{PLL}$ are in phase. If, however, the positive flank of $H_{FINE}$ is not within any certain time window which is defined by the count condition $N=(N0-\Delta F)$ to $(N0+\Delta F)$, the PLL circuit is not locked. The window detector 57 then generates a pulse SET which sets the counter 56 on the value N0. In that way the PLL circuit is brought more quickly into lock. The counter 56 further supplies a pulse $H_{SAV}$ at a predetermined count state, which pulse designates the beginning of the picture content of each line, the so-called active line. This pulse is also supplied to the clock input of a D flip-flop 58 and to an H phase-shifter 59. The delay time of the H phase shifter 59, which can be adjusted by means of a control HOR DELAY, is applied to the input 60. The phase shifter 59 is clocked with the clock signal $13.5_{REF}$ and supplies a signal $H_{REF}$ at its output 61 which is supplied to the input processor 1 and to the write/read control circuit 5 of FIG. 1.

A flip-flop 62 is also clocked with the signal $H_{REF}$. The first clocking of the signal F by means of the flip-flop 58 thereafter brings the pulses of the signals F into the pattern of the H pulses. The second clocking by the flip-flop 62 transfers the F pulses thereafter into the shifted pattern of the pulses of the signal $H_{REF}$, which owe their shift to the phase-shifter 59. The signal $F_{REF}$ produced by the flip-flop 62 is supplied through an output terminal 63 to the gen-lock circuit of the write-/read control circuit 5 of FIG. 1.

The phase-shifter 59 can be constituted in a known way with a help of a ring counter which counts to from 0 to 863 in the case of a 625 line standard and, after reaching that count state $N_{MAX}=863$, again begins counting from 0. The use of such a ring counter as the phase shifter 59 will now be explained with reference to the timing diagrams shown in FIG. 6. The counter is set to a HOR DELAY in the range from 0 to 863 provided at its load input by pulses of the signal $H_{SAV}$. When the count reaches $N_{MAX}=863$ a pulse of the signal $H_{REF}$ is generated which is produced sooner or later according to the loaded-in value HOR DELAY. A commercially , available counter can be used which has a MAX output for producing the pulse REF by decoding of the count state.

Figure 6:
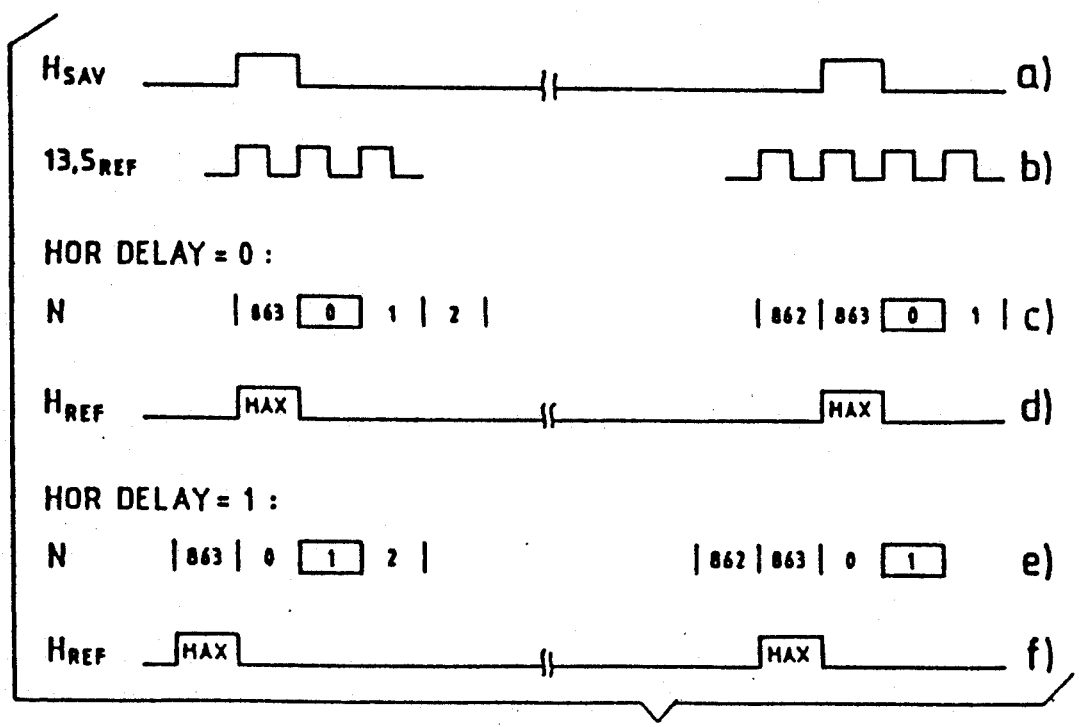
FIG. 6 is a timing diagram of signals of a ring counter utilized in the gen-lock circuit of FIG. 5.

In FIG. 6 line a) shows the signal $H_{SAV}$ and line b) shows the signal $13.5_{REF}$ with which the phase shifter 59 is clocked. The lines c) and d) represent the count state N and the signal $H_{REF}$ for the case when the value 0 is supplied as HOR DELAY. If HOR DELAY=1 is inserted, the count state $N_{MAX}$ is reached one clock period earlier, so that $H_{REF}$ is advanced by one clock period compared to $H_{SAV}$. This is illustrated in lines e) and f) of FIG. 6.

Before taking up the matter of further details of circuit components, the system of FIG. 1 will now be further explained. The input processor 1 and the gen-lock circuit 4 have the capability of synchronizing an incoming component signal with reference to a horizontal frequency reference signal. The output signal Y1, C1 of the input processor 1 follow the signal $H_{REF}$, the phase position of which can be set in 10 ns steps and in steps of the clock signal $13.5_{REF}$ of 74 ns. Likewise the signals $F_{IN}$ and $F_{REF}$ are in phase with the signal $H_{REF}$.

$F_{IN}$ nevertheless still has a vertical sync offset that can have a wide range of value with respect to $F_{REF}$, which can be compensated out exactly, with respect to picture field or with respect to frame, by means of the frame memory 2 and an address generator located in the write/read circuit 5. This will be explained more precisely in what follows with reference to FIG. 7.

The write/read control circuit of FIG. 7 receives the signals $H_{REF}$ and $13.5_{REF}$ from the gen-lock circuit 4 over the input terminals 71 and 72. The signal FIN is supplied from the input processor 1 to an input terminal 74. The addresses ADDR for the frame memory 2 of FIG. 1 are made available at an output 75. The addresses have a horizontal and a vertical component. A vertical picture shift is possible in a simple way with this orthogonal addressing.

The generation of the vertical components of the addresses is performed during read out by means of a counter 76 and during write-in by means of another counter 77, of which the 10-bit wide output signals can be supplied over a changeover switch 78 to a read only memory (PROM) 79. The counters 76 and 77 are blocked by the signal $H_{REF}$. Resetting takes place, in the case of the counter 76, in the SYNC mode by means of the signal $F_{REF}$ and in the case of the counter 77 by means of the signal $F_{IN}$. The counters 76 and 77 have a counting range from 0 to 624 (for the 625-line standard) and thus show a direct association with the line numbers of the video signals. The counter 76 is constituted as a ring counter and can be set to a VERT DELAY value supplied at 80 when it reaches the maximum count content. In this way a vertical shift of the output signals of the frame memory 2 with respect to the input signals can be set at a particular value.

Since horizontal synchronization is already produced by the input processor 1 of FIG. 1, different horizontal components of the addresses are not needed in writing and reading. For pixel addressing within the line, accordingly, merely a counter 81 is provided which is clocked with the signal $13.5_{REF}$ and is reset with the signal $H_{REF}$. The blanking and sync signals $A_V$, $S_V$, $S_F$, $A_H$ and $S_H$ are generated in a known way by decoders 82 and 83 in response to the output signals of the counters 76 and 81 and then supplied over an output 84 to the output processor 3 of FIG. 1.

The signal $S_{REF}$ proceeds from the gen-lock circuit over an input 70 to the write/read control circuit of FIG. 7 and serves for switching over the counters 76, 77 and 81 and the decoders 82 and 83 between a setting for the 625 line and 50 Hz standard and the 525 line and 60 Hz standard. The signal $S_{REF}$ also serves for switching over the address generation system between the standards and for that purpose it is supplied to one input of the PROM 79.

The following explanations refer to a code conversion of the vertical components and the combination of the vertical and horizontal components into a common 16-bit wide signal ADDR, the horizontal components having been generated by the counters 81 and either 76 or 77. Since the internal architecture of the write/read (RAM) components of the frame memory 2 do not correspond to the orthongonal structure of the video signals, but rather to a one-dimensional storage line, code conversion of the addresses is necessary. Furthermore, simultaneous writing into a field of the frame memory and reading out of it is not possible. For this reason a write/read signal R/W SEL is obtained from the state of the counter 81 by means of the decoder 83 The R/W SEL signal controls the switch 78 and changes the logic level of all four rhythms of the signal $13.4_{REF}$.

The code conversion of the addresses takes place in two steps. First the vertical components F-ADDR which are present in time multiplex are split into a V and a 2 V portion by means of the PROM 79. The one bit wide 2 V portion designates the picture field (for example LO signifies first field and HI signifies second field), whereas the V portion V-ADDR represents the vertical position of the respective pixels within the particular picture field. The addresses V-ADDR are generated in the PROM 79 according to the following formulae:

F-ADDR = 0...311⟶

V-ADDR = F-ADDR.104; 2V = 0,

F-ADDR = 312...624⟶

V-ADDR = (F-ADDR − 312).104; 2V = 1.

The addresses H-ADDR are added to the addresses V-ADDR. The addresses H-ADDR can have any value between 0 and 103. This value range is sufficient for the addresses H-ADDR even though 832 pixels can be deposited in the frame memory per line. The frame memory, however, has the benefit of a multiplex structure, by which 8 successive pixels can be written in or read out under a single address. For this reason, only 7 binary places are needed for the addresses H-ADDR out of the 10 binary places of the output signals of the counter 81.

In one period of the sync signal $H_{REF}$ there occur in fact 864 periods of the clock signal $13.5_{REF}$, so that data from 864 pixels per line could arrive. Only the data from 832 pixels are stored, however, i.e. those which lie within the so-called active line period. In that way expense can be spared in the design of the frame memory 2 of FIG. 1.

The field designating signal 2 V is led through a 2 V modifier and is added as the 16th bit of the addresses ADDR. In normal operation of the system of the invention, in which the component signals supplied to the input are delayed in such a way that they can be obtained from the system of the invention in synchronism with the reference signals that are made available, the signal 2 V is not changed by the 2 V modifier 86. Thus the following relation then results between the pixels and the storage addresses ADDR during the first picture field:

| Line 1: | 0, | 1, | 2 | ... | ..., 103 |
| Line 2: | 104, | 105, | 106 | ... | ..., 215 |
| . | . | . | . | | . |
| . | . | . | . | | . |
| . | . | . | . | | . |
| In the second picture field: | | | | | |
| Line 312: | 0, | 1, | 2 | ... | ..., 103 |
| . | . | | | | |
| . | . | | | | |
| . | . | | | | |
| Line 625: | 32448, | ... | ... | | ..., 32551. |

The 2 V modifier 86 makes it possible whenever the input signal drops out to read out the last undisturbed picture field from the frame memory 2. In order to recognize a drop out of the input signal, the retriggerable monoflop 25 of FIG. 1 is provided which is continuously triggered by the clock signal $27_{IN}$ contained in the input signal, as a result of which the output Q stays at the level LO so long as the input signal is present. If this signal drops out and remains absent, the signal NOIN goes to the level HI. The signal NOIN and the signal $F_{IN}$ are supplied from the input processor to the inputs 91 and 92 of the 2 V modifier 86. With the rising flank of the signal NOIN a signal FREEZE is immediately produced and passed through the output 93 of the 2 V modifier 86 to the frame memory 2, whereby the writing in of the disturbed pixels into the frame memory is immediately broken off. Finally, during the rising flank of the signal NOIN, the signal $F_{IN}$ is interrogated to determine in which picture field the input signal has dropped out. Depending during which fielde the signal dropped out, the other field, therefore the last stored field which was not disturbed in read out of the frame memory for the duration of the disturbance. The signal 2 V at the output 95 of the 2 V modifier then remains constantly at HI or LO, as the case may be, during the read out phase.

If now an input signal again appears, the signal NOIN goes back to the level LO. Before normal writing and reading operation is restored, however, care is taken to assure that the content of a complete frame of the signals received after the disturbance is stored in the frame memory 2 before this part of the memory is read out. For that purpose when the FREEZE signal is reset to LO the operation must wait until the beginning of a picture field corresponding to that field in which the disturbance arose and only then writing the signals of this particular picture field into the frame memory, while the reading out of the other picture field takes place. Only when the overwriting of the disturbed picture field is complete can the field change in read out again be performed.

The above-described events relating to a drop-out of the input signal can be controlled advantageously by a switching system which constitutes an essential principal part of the 2 V modifier. This is illustrated in the block circuit diagram shown in FIG. 8 for the 2 V modifier 86 of FIG. 7 and the state diagram relating thereto shown in FIG. 9, to which reference will now be made in a further explanation. The 2 V modifier of FIG. 8 has inputs 91 and 92 respectively for the signals $F_{IN}$ and NOIN. The field signal $2V_{IN}$ is furnished at another input 94. The signals FREEZE and $2V_{OUT}$ can be respectively obtained from the outputs 93 and 95 and supplied to the frame memory 2.

In addition to the switching system 96 the 2 V modifier contains two multiplexers 97 and 98. The signal R/W SEL is supplied from the decoder 83 through an input 99 to the multiplexer 98 in order to control the multiplexer.

Figure 9:
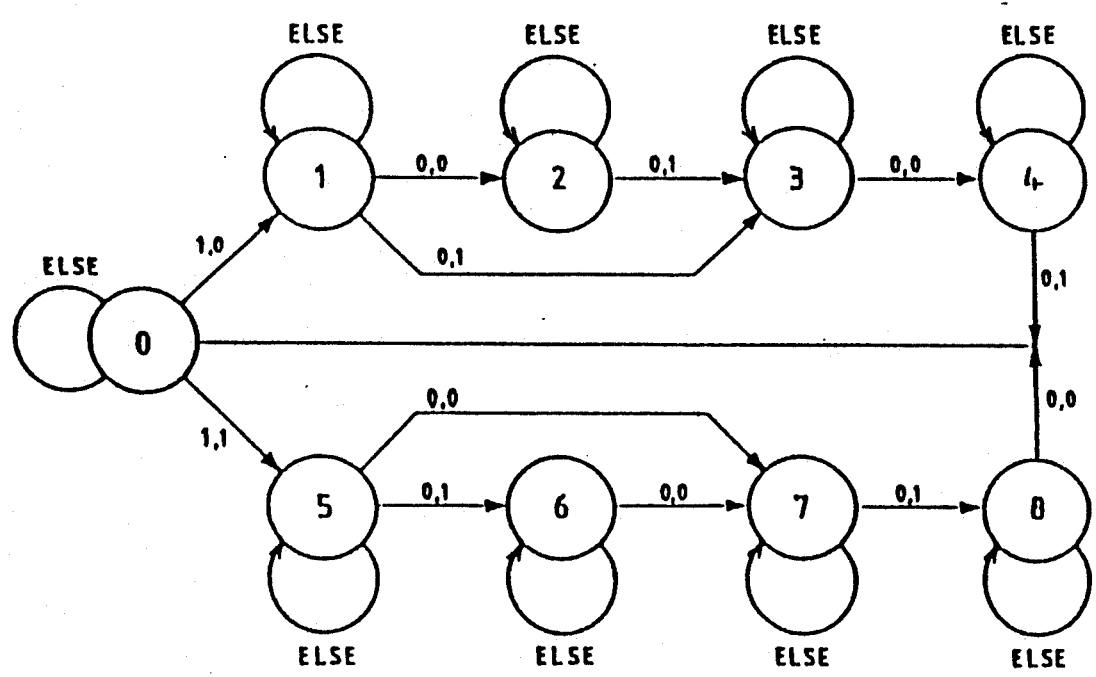
FIG. 9 is a state diagram for explaining the operation of the 2 V modifier of FIG. 8.

Switching systems suitable for the 2 V modifier are known, so that the description of circuit details is not necessary here, except to point out that the switching system 96 primarily contains a counter for the states 0 to 8 which are shown in the state diagram of FIG. 9 by circles. Which state the switching system takes on depends upon the momemtary state and upon the input variables NOIN and $F_{IN}$. By corresponding decoding of the state there are produced the output variables CLEAN FIELD, REPEAT and FREEZE. At the outputs of the switching system 96 there are shown, by circled numerals in FIG. 8, the particular states at which the particular output variable takes the level HI.

When a drop-out of the input signal occurs, the 2 V modifier should merely affect the read out. The already mentioned interruption of writing disturbed input signals is directly controlled in the frame memory by the signal FREEZE. During write-in operation of the frame memory the signal 2 V is therefore directly supplied through the multiplexer 98 from the input 94 to the output 95 and thus not changed. For that purpose the signal R/W SEL is supplied through the control input 99 into the multiplexer 98. In a position A of the multiplexer 98 in the read-out phase, in which the switch 98 is in the lower position shown in FIG. 8, the signal 2 V is likewise passed on unchanged through the 2 V modifier. In the position B of the multiplexer 97 the signal CLEAN FIELD is provided to the frame memory 2 through the output 95 as the signal 2 V. If the signal CLEAN FIELD is at HI (states 1, 2, 3 and 4) the second picture field is read out, whereas when CLEAN FIELD is at LO the first picture field is read out. When the output REPEAT is at LO (this is the case in state 0) the multiplexer 97 is in its position A.

The following explanations are based on the case in which an interruption of the input signal begins in the first field and later ends either in a first field or in a second field. In this case, the states 0, 1, 2, 3, 4 and 0 are run through successively in that order. Before the occurrence of the interruption the switching system is in its normal state 0. The beginning of the interruption in the first field is signalized by the input magnitudes NOIN=1 and $F_{IN}$=0, as a result of which the switching system changes into state 1. As a result FREEZE becomes HI and the writing into the frame memory stops. The signal REPEAT switches the mutliplexer 97 to the input B where the signal CLEAN FIELD=HI is present, as a result of which the undisturbed second field is read out of the frame memory 2. For the duration of the interruption the switching system remains in its state 1. Its remaining in a state is signified in the state diagram by a loop ELSE, which shows that by those values of the input magnitudes, which do not lead to other states, no change of state takes place.

The end of the interruption is signified by NOIN=0. If this occurs in the second field TB2 ($F_{IN}$=1) the states 3, 4 and 0 are successively produced. If the disturbance ends in the first field TB1 ($F_{IN}$=0), however, the state 2 is first run through in the succession of states. The signal FREEZE is set LO when the state 4 is reached, so that at the beginning of the originally disturbed field, writing-in is again begun. At this point that picture field begins to be overwritten which was being written up to the time of the interruption. Since the end of an interruption is not limited with respect to picture field change, the states 2 or 3 need to precede the state 4. Thus the transition from the state 1 to the state 2 is provided in the termination of the interruption during the first field TB1 and the transition from state 1 to state 3 when the end of the interruption occurs in the second field TB2.

After the content of a first picture field is again written into the frame memory during the state 4 of the switching system, the next field change ($F_{IN}$=1) produces the transition to state 0 and thus to normal operation. The signal REPEAT then takes on the level LO and thereby switches the multiplexer 97 to its input A, so that the signal 2 V is transmitted unchanged over the output 95 to the frame memory 2. If an interruption begins in the second field, the states 5, 6, 7 and 8 are run through in a corresponding way.

In accordance of a further development the system of the invention can be operated as a field synchronizer. Before this mode of operation is explained the difference between frame synchronizing and field synchronizing should be mentioned in a general way. A field synchronizer is capable of compensating out exactly, with respect to picture field, a propagation time difference between the input signal and the reference signal and for that reason requires only a memory having a capacity of one field. This has advantages and disadvantages. The advantage is that the maximum propagation time from input to output can amount to only negligibly more than a field period, so that the synchronism of picture and sound is only slightly disturbed.

Two disadvantages of the field synchronizer stand against the above-mentioned advantage. If for example the propagation time difference between the input signal and the reference signal is greater than a field period, a field interchange is necessary as a result of which the field must be either left out or repeated, which is noticeable in either case by a vertical jump of the picture. On the other hand, the effect of the time discontinuity involved in the read-out which disturbs motion in the picture is only half as great as in the case of frame synchronizer.

The second disadvantage which is generally involved in the use of a field synchronizer is the inability of reading out a last undisturbed field from a field memory when there is an interruption of the input signal. In the operation of the system of the present invention as a field synchronizer, however, this last disadvantage is avoided because a frame memory is available. Thus the system of the invention can advantageously be used as a field synchronizer.

After switching over from the SYNC mode to the FIELD mode, a modification of the addresses V-ADDR is necessary during read out. This is necessary, however, only when the time difference between the input signal and the reference signal is greater than one picture field. Therefore the signal R/W SEL and another signal INVERT are respectively applied to additional inputs of the PROM 79 of FIG. 7. In the SYNC mode the signal INVERT=LO and it is not released until the command signal FIELD mode is supplied through the input 90 is released over the reset input of a D flip-flop 87. During the clocking of the D flip-flop 87 with the signal $F_{IN}$ an interrogation of the signal $F_{REF}$ takes place at every pulse of the signal $F_{IN}$. This operation is shown in FIG. 10.

Figure 10:
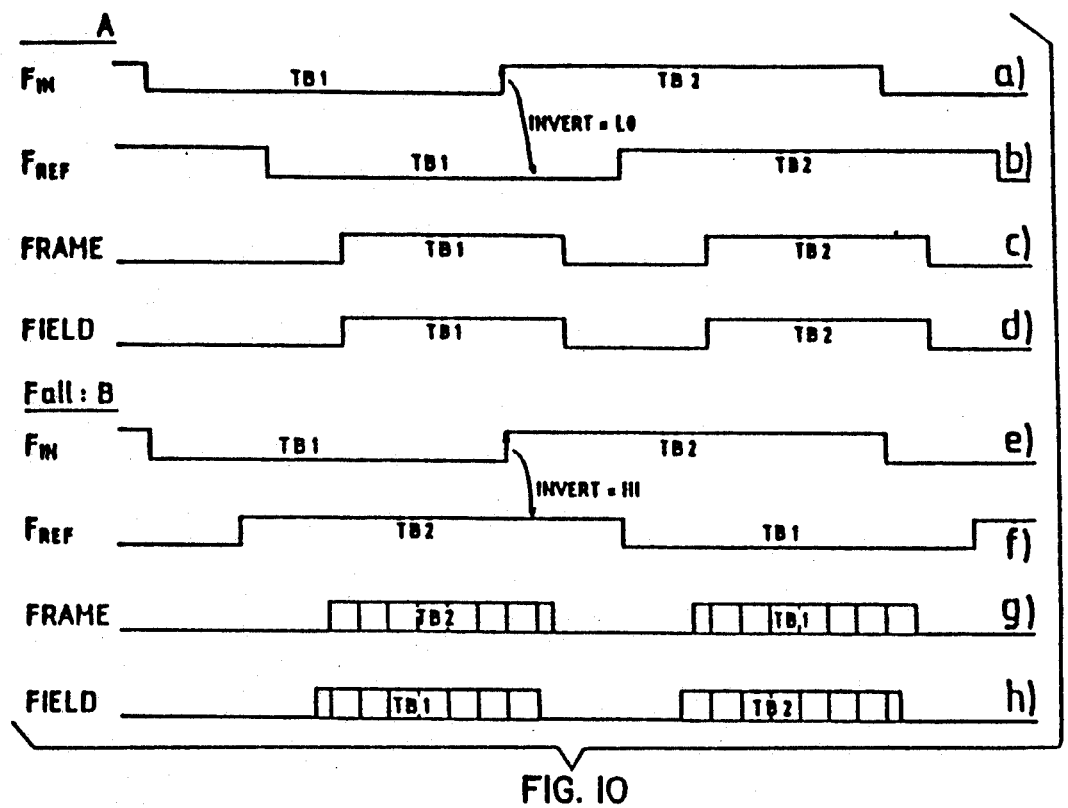
FIG. 10 is a timing diagram of which lines a), b), c) and d) relate to a case A and lines e), f), g) and h) relate to a case B.

In FIG. 10 the lines a) and b) or e) and f) show in each case the pair of signals $F_{IN}$ and $F_{REF}$ for the two different propagation time differences. In the lines c) and d) or g) and h) the active lines of the first or second field being read out are shown, the line count being drastically reduced to unrealistic values for simplification of the illustration. In the case A the propagation time difference between the input signal and the reference signal is greater than a field interval, as a result of which the interrogation by the positive flank of the signal $F_{IN}$ produces the result INVERT=LO, this interrogation being illustrated in FIG. 10. In the case B the propagation time difference between the input signal and the reference signal is less than one field, so that the corresponding interrogation result is INVERT=HI.

In the SYNC mode and in the FIELD mode case A the synchronizer always produces at its output a field sequence that agrees with $F_{REF}$ whereas in the FIELD mode case B the field sequence is inverted, since by definition the maximum propagation time between the input signal and the output signal may not exceed one field interval.

The field inversion cannot, however, be produced by inverting the 2 V addresses. This is essentially impossible, because in the standard for the component signal the time position of the frame pulse (designated as $F_{RES}$ or $F_{REF}$ in connection with the system of the invention) is so defined that the first field consists of 312 lines and the second field of 313 lines. On account of this asymmetry a supplementary change of the V addresses is necessary during the read-out phase. Consequently when INVERT=HI and R/W SEL=HI the V and 2 V addresses are generated by the PROM 79 (FIG. 7) as follows:

F-ADDR = 0...311⟶

V-ADDR = F-ADDR.104; 2V = 0,

F-ADDR = 312...624⟶

V-ADDR = (F-ADDR − 312).104; 2V = 1.

Figure 11:
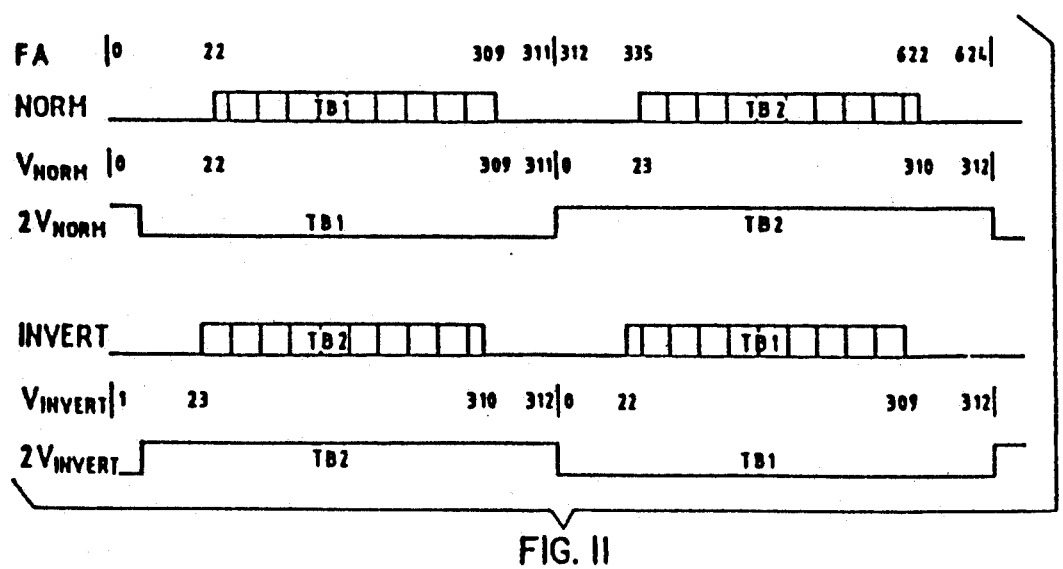
FIG. 11 is a combination of a timing diagram and addressing data for explaining the manner of operation for a picture field.

FIG. 11 sets forth timing diagrams for showing the differences between the normal and the modified V and 2 V addresses, in which, however, the factor 104 is not taken into account in order to simplify the illustration. Furthermore, in FIG. 11 the active part of the field is represented both for normal read out and also for inverted read out.

The timing diagrams of FIG. 11 show that the field inversion corresponds to a delay of 312 lines or an advance of 313 lines. In order to produce this result, the frame addresses F-ADDR from 0 to 311 are shifted by 1, in accordance with the above given formulae. The address V-ADDR=312 appears both in the first and in the second field, whereas the address 0 is not read-out in the second field during a field inversion. In inverted read out both fields are advanced by half a line in time, which corresponds to a vertical jump of the picture position by a line position.

The system of the invention makes possible still another mode of operation which is here designated as the LINE mode. In this mode the input signal is brought into synchronism only with the H position of the reference signal, while the V and 2 V position continues to correspond with the input signal. For this reason, only the FIFO memory 15 (FIG. 2) is active in the input processor during operation in this mode, while the frame memory 2 (FIG. 1) passes the signals undelayed to its output. This can be produced either by bypassing the frame memory, which would involve considerable circuit expense because of the great bit width or by switching over the addressing of the frame memory. The latter operation is produced by having the counter 76 (FIG. 7), which generates the addresses for read out to be reset corresponding to the counter 77 by the signal $F_{IN}$. In this way both counters generate the same addresses, so that the signals written into the frame memory are immediately read out again. For switching over the counter 76 the signal LINE mode is provided over an input 88 (FIG. 7) for control of a multiplexer 89. The switching over of the operation mode of the counter 76 has the advantage that the output picture position is shiftable just as in normal operation by the signal VERT DELAY.

In summary, the operation modes can be briefly described as follows:

In the SYNC mode the picture position and the timing of the synchronizing pulses of the input signal always agree with those of the reference signal. In the FIELD mode only the position of the H synchronizing pulses are in agreement, while the field positions can be inverted. In the LINE mode, which may also be referred to as the H-PHASER mode, the input signal is merely delayed to the H phase of the reference signal. Differences that may exist in the frame synchronization between input signal and reference signals are preserved. In the DELAY mode the system of the invention operates as a controllable delay transmission line. The internally utilized reference signal is derived from the input signal, so that the supplying of an external reference signal is not necessary. In all modes both the picture content and the synchronizing signals of the output signal can be adjusted with reference to pixel phase (sample or clock phase) horizontal sync phase, and vertical sync phase.

Although the invention has been described with reference to a particular illustrative example, it will be understood that variations and modifications are possible within the inventive concept.

I claim:

1. An apparatus system for synchronizing a color video signal in which no color carrier wave is present, said color video signal being in the form of a set of digital video component signals combined with first synchronizing signals to which a first clock signal for digital transmission is locked, said apparatus system comprising:

a source of reference synchronizing and clock signals (4, 45, 46), said reference synchronizing signals being of the same frequencies as said first synchronizing signals and said reference clock signal being of a frequency which is entirely in step with a pulse sequence of the frequency of said first clock signal;

a digital separator circuit (16) for separating said first synchronizing signals and said first clock signal from said set of digital video component signals and providing at least one second synchronizing signal and a second clock signal at respective outputs of said digital separator circuit;

a first-in-first-out (FIFO) memory (15) having at least one output for supplying a delayed digital color video signal, having a write-in control input connected to said output of said second clock signal of said digital separator circuit, having at least one input connected to a source (16) of said color video signal, and having a read-out control input connected to said source of reference synchronizing and clock signals at least for supply of said reference clock signal;

a frame memory (2) having at least one data input connected to said at least one output of said FIFO memory, having at least one data output, and having address and control inputs;

a read-write control circuit (5) for said frame memory (2) having inputs connected to said source of reference synchronizing and clock signals and outputs connected to said frame memory for controlling the writing into said frame memory from said FIFO memory and the reading out of said frame memory through said at least one output thereof; and an output processor unit (3) connected for receiving said reference synchronizing and clock signals from said source thereof, having at least one input connected to said at least one data output of said frame memory (2) and containing circuits (33) for inserting synchronizing and blanking signals from said read/write control circuit into an output signal received from said at least one data output of said frame memory, to produce a complete digital color video signal in which no color carrier wave is present.

2. The apparatus system of claim 1, wherein means are provided for manually providing a DELAY mode command signal and wherein means are provided for selectively substituting said second synchronizing and clock signals derived from said color video signal for said reference synchronizing and clock signals supplied at said source thereof, in response to said DELAY mode command signal, for operation of said apparatus system in a delay mode.

3. The apparatus system of claim 1, wherein means are provided for manually supplying a FIELD mode command signal and also means, responsive to said FIELD mode command signal during readout of said frame memory at a phase difference from write-in which is greater than a picture field interval, for producing by modification of addresses, read-out from said frame memory of a field which is always a field that does not agree with a reference field designation of a contemporary reference field designation signal ($F_{REF}$) provided by said source of reference synchronizing and clock signals.

4. The apparatus system of claim 3, further comprising means for producing, in response to said FIELD mode command signal, during readout of said frame memory at a phase difference from write-in which is less than a picture field interval, in succession, line components of address from 0 to n/2−3/2 for a first picture field of a frame and line components of address from 0 to n/−1/2 for a second picture field of a frame for said addresses and for producing, in response to said FIELD mode command signal during readout of said frame memory at a phase difference from write-in which is more than a picture field interval, in succession, line components of addresses from 0 to n/2−1/2 for a first picture field of a frame and line components of addresses from to n/2−1/2 for a second picture field of a frame, the letter n herein representing a number which is either 625 or 525 according to the line number standard of said color video signal.

5. The apparatus system of claim 1, wherein a clocked delay circuit (20) is provided for setting a minimum delay between write-in and read-out for said FIFO memory, said clocked delay circuit having a reset input connected to a frame pulse ($F_{RES}$) output of said digital separator circuit (16), a clock input connected to a clock pulse output of said source of reference synchronizing and clock signals and a delay timing signal output connected to a reset input of a bistable circuit (19, 21) clocked twice by each single horizontal synchronizing pulse obtained through a connection to a horizontal synchronizing pulse output of said source of reference synchronizing and clock signals, whereby the start of read-out is delayed until said horizontal synchronizing pulse from said source of reference synchronizing and clock signals first appears following a frame pulse ($F_{RES}$) from said frame pulse output by at least a predetermined delay interval.

6. The apparatus system of claim 1, wherein said frame memory has two data inputs for storing, respectively, a luminance sample value and a chrominance sample value in parallel when a single write-in clock pulse is supplied to said read-write control circuit from said source of reference synchronizing and clock signals and likewise has two data outputs for reading out, respectively, said luminance and chrominance sample values in parallel when a single read-out clock pulse is supplied to said read-write control circuit from said source of reference synchronizing and clock signals, said luminance and chrominance sample values being thereby written in and read out in accordance with a 4:2:2 standard.

7. The apparatus system of claim 1, wherein said digital separator circuit includes a circuit for deriving a field designation signal (F) for distinguishing from each other first and second fields of each frame and has an output connected for supplying said field designation signal to said FIFO memory (15), wherein said FIFO memory has memory capacity for storage of said field designation signal, and wherein a minimum delay circuit (19, 20, 21) triggered by a frame pulse ($F_{RES}$) from a frame pulse output of said digital separator circuit is interposed between said read-out control input of said FIFO memory and said source of reference synchronizing and clock signals for enabling an output of said FIFO memory to supply from storage said field designation signal as a delayed frame signal ($F_{IN}$) during read-out as well as for timing the enablement of other read-out from said FIFO memory.

8. The apparatus system of claim 7, wherein said read-write control circuit for said frame memory includes an address generating circuit comprising a first counter (77) for generating sequences of addresses for write-in and a second counter (76) for generating sequences of addresses for read-out, said first counter being connected for starting of its count by a horizontal synchronizing signal obtained from said source of reference synchronizing and clock signals and for being reset by a frame start flank of said delayed frame signal ($F_{IN}$) and said second counter being connected for starting of its count by said horizontal synchronizing signal obtained from said source of reference synchronizing and clock signals and for being reset by a reference frequency frame pulse signal ($F_{REF}$) obtained from said source of reference synchronizing and clock signals, said memory address generating circuit further including a function generator (PROM 79) and connected for supplying vertical components of memory addresses in response to inputs from said first and second counters.

9. The apparatus system of claim 8, wherein said read-write control circuit includes a first multiplexer (78) having selectable first and second input respectively connected to the count outputs of said first and second counters and having an output connected to an input of said function generator (79) and also includes combining means (85, 86, 81) for combining vertical address, horizontal address and a field offset ($2V_{OUT}$) into a single address for said frame memory.

10. The apparatus system of claim 9, wherein a third counter (81) clocked by clock signals from said reference source of synchronizing and clock signals is utilized to generate horizontal addresses which are then supplied to a combining circuit 85 for adding them to vertical addresses provided by said function generator (PROM 79), said third counter having a reset input connected to said source of reference synchronizing and clock signals for resetting said third counter by said horizontal synchronizing signal of said source of reference synchronizing and clock signals.

11. The apparatus system of claim 10, further comprising means for manually providing a LINE mode command signal and wherein a second multiplexer (89), provided in said read-write control circuit (5) for said frame memory, is interposed ahead of a reset input of said second counter and has its output connected thereto, said second multiplexer having a control input connected to said means for manually providing a LINE mode command signal, in response to which LINE mode command signal said second multiplexer connects said reset input of said second counter (76) to said FIFO memory for resetting said second counter by said frame start flank of said delayed frame signal ($F_{IN}$) supplied from a read-out output said FIFO memory, and, when said LINE mode command signal is not present said second multiplexer is made to respond by connecting the reset output of said second counter for receiving said reference frequency frame pulse signal ($F_{REF}$) from said source of reference synchronizing and clock signals.

12. The apparatus system of claim 11, wherein a timing circuit (25), set by clock pulses derived from said color video signal which is supplied to said digital separator circuit, is provided as a drop-out detector circuit, producing at an output thereof a drop-out signal output if said clock pulses fail to arrive for a predetermined number of nanoseconds, said drop-out signal output being connected to a first input of a 2 V modifier circuit (86) which also has a second input connected for receiving said delayed frame signal ($F_{IN}$) from a read-out output of said FIFO memory, and a third input connected to said function generator (79) for receiving a second field designation signal ($2V_{IN}$) therefrom and a fourth input connected to a source of horizontal address signals generated by said third counter, for thereby producing, by means of an output FREEZE signal and a third field designation signal ($2V_{OUT}$), repetition of read-out of a picture field fully stored in said frame memory during persistence of said drop-out signal output and continuation of repetition of said read-out thereafter until another field is fully written into said frame memory.

13. The apparatus system of claim 12, wherein said 2V-modifier circuit (86) is constituted by at least one additional multiplexer for at least one of the bits of each of said addresses and a switching matrix (96) and wherein said at least one additional multiplexer (97, 98) and said switching matrix (96) are interconnected and constituted for providing said third field designation signal ($2V_{OUT}$) and said output FREEZE signal in response to said inputs of said 2V-modifier circuit (86).

14. The apparatus system of claim 13, wherein there are two said additional multiplexers (97, 98) for said at least one bit of each of said addresses, including a third multiplexer (97) having a selection terminal and being connected for selectively supplying said at least one bit for combination in said addresses either from said function generator (79) or from a CLEAR FIELD output of said switching matrix (96) in response to a repeat command signal provided at a second output of said switching matrix, and a fourth multiplier (98) responsive to a signal (R/W SEL) from said read-write control circuit (5) designating whether connections for read-out or write-in are to be provided, a write connection of said fourth multiplier being connected to said second field designation signal ($2V_{IN}$) from said function generator (79) and the read connection of said fourth multiplier being connected to the selection terminal of said third multiplexer (97) and wherein said switching matrix is so constituted as to enable said switching matrix and said third and fourth multiplexer connected thereto to constitute means for producing, in response to said inputs of said inputs of said 2 V modifier circuit (86), the following sequence of operations subsequent to the producing of said dropout signal output by said dropout detector circuit (25):

immediately after the appearance of said dropout signal, the provision of said output FREEZE signal output to said frame memory for inhibiting writing into said frame memory;

determination from said delayed frame signal ($F_{IN}$) in which field of a frame the dropout began;

the alteration of said addresses for reading out from said frame memory in such a way that a complete field stored in said frame memory preceding said dropout will be repeatedly read out, and after the dropout signal disappears, producing a switchover from the reading out of said repeatedly read out field to the reading out of a different field only after a new field has been fully written into said frame memory in place of the field in which the dropout occurred.

* * * * *